US010329825B2

(12) United States Patent
Koike et al.

(10) Patent No.: US 10,329,825 B2
(45) Date of Patent: Jun. 25, 2019

(54) WINDOW REGULATOR

(71) Applicant: Johnan Manufacturing Inc., Nagano (JP)

(72) Inventors: Yuka Koike, Nagano (JP); Yusuke Yamazaki, Nagano (JP); Manabu Shimomura, Nagano (JP)

(73) Assignee: JOHNAN MANUFACTURING INC., Nagano (JP)

(*) Notice: Subject to any disclaimer, the term of this patent is extended or adjusted under 35 U.S.C. 154(b) by 50 days.

(21) Appl. No.: 15/542,849

(22) PCT Filed: Jan. 14, 2016

(86) PCT No.: PCT/JP2016/051003
§ 371 (c)(1),
(2) Date: Jul. 11, 2017

(87) PCT Pub. No.: WO2016/114357
PCT Pub. Date: Jul. 21, 2016

(65) Prior Publication Data
US 2017/0370145 A1 Dec. 28, 2017

(30) Foreign Application Priority Data
Jan. 15, 2015 (JP) .................. 2015-005944

(51) Int. Cl.
E05F 15/689 (2015.01)
E05F 11/48 (2006.01)
(Continued)

(52) U.S. Cl.
CPC .............. E05F 15/689 (2015.01); B60J 1/17 (2013.01); E05F 11/48 (2013.01); E05F 11/485 (2013.01);
(Continued)

(58) Field of Classification Search
CPC ..... E05F 11/485; E05F 11/486; E05F 11/385; E05F 15/689; E05Y 2900/55; E05Y 2201/654
See application file for complete search history.

(56) References Cited

U.S. PATENT DOCUMENTS 5,740,630 A * 4/1998 Medebach ............ E05F 11/485
49/352
5,864,987 A * 2/1999 Mariel .................. E05F 11/385
49/349
(Continued)

FOREIGN PATENT DOCUMENTS

JP 09-150631 A 6/1997
JP 2007332583 A 12/2007
(Continued)

OTHER PUBLICATIONS

International Search Report issued in the corresponding application No. PCT/JP2016/051003 dated Apr. 19, 2016.
(Continued)

Primary Examiner — Justin B Rephann
(74) Attorney, Agent, or Firm — Roberts Mlotkowski Safran Cole & Calderon P.C.

(57) ABSTRACT

A window regulator includes a carrier plate holding a windowpane, a drum rotated by driving a motor that generates a driving force, a wire whose one end is connected to the carrier plate and whose other end is connected to the drum, a wire end fixed to an end on a side of the one end of the wire, and a housing member that is formed of a synthetic resin and houses the wire end. The housing member is configured to define a housing hole that is surrounded by a base in which an inserting hole to insert the wire is formed, and a sidewall that is formed extending from an outer edge of the base. The wire end is housed in the housing hole while
(Continued)

being pressed against a protrusion that protrudes from the sidewall.

6 Claims, 9 Drawing Sheets

(51) Int. Cl.
  *B60J 1/17* (2006.01)
  *F16H 19/06* (2006.01)
  *F16H 35/18* (2006.01)
(52) U.S. Cl.
  CPC ......... *F16H 19/0631* (2013.01); *F16H 35/18* (2013.01)

(56) References Cited

U.S. PATENT DOCUMENTS

| | | | | |
|---|---|---|---|---|
| 5,950,365 A * | 9/1999 | Lieb | ............................ | B60J 1/17 49/28 |
| 6,272,948 B1 * | 8/2001 | Klippert | ................ | E05F 11/485 74/500.5 |
| 9,790,728 B2 * | 10/2017 | Arimoto | ............... | E05F 15/689 |
| 2004/0065018 A1 * | 4/2004 | Regnier | ................ | E05F 11/485 49/352 |
| 2004/0154227 A1 * | 8/2004 | Yoshimura | ............ | E05F 11/385 49/352 |
| 2005/0016070 A1 * | 1/2005 | Cardine | ................ | E05F 11/485 49/352 |
| 2005/0194580 A1 * | 9/2005 | Mazouzi | ................ | E05F 11/485 254/231 |
| 2007/0180773 A1 * | 8/2007 | Fortin | ................... | E05F 11/485 49/352 |
| 2007/0251148 A1 * | 11/2007 | Watson | ................. | E05F 11/485 49/352 |
| 2007/0294947 A1 * | 12/2007 | Fassbender | ........... | E05F 11/382 49/227 |
| 2008/0236049 A1 * | 10/2008 | Arimoto | ............... | E05F 11/382 49/352 |
| 2009/0007495 A1 * | 1/2009 | Smith | ................... | E05F 11/385 49/352 |
| 2010/0031576 A1 * | 2/2010 | Sasaki | .................. | E05F 11/382 49/360 |
| 2013/0255411 A1 * | 10/2013 | McCorkell | ........... | E05F 11/481 74/89.22 |

FOREIGN PATENT DOCUMENTS

| | | |
|---|---|---|
| JP | 2008-14104 A | 1/2008 |
| JP | 2012057425 A | 3/2012 |
| JP | 5160750 B2 | 3/2013 |
| JP | 5638888 B2 | 12/2014 |

OTHER PUBLICATIONS

Office Action issued in the corresponding JP application No. 2015-005944 dated Apr. 5, 2016.
Office Action issued in the corresponding JP application No. 2015-005944 dated Sep. 6, 2016.
International Preliminary Report on Patentability PCT/JP2016/051003 dated Jul. 27, 2017, 6 pages.
Office Action issued in the corresponding CN Application No. 2016-80005734.6 dated Mar. 19, 2018.

* cited by examiner

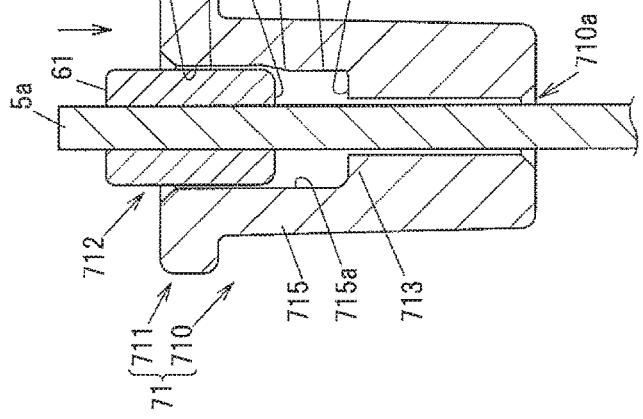
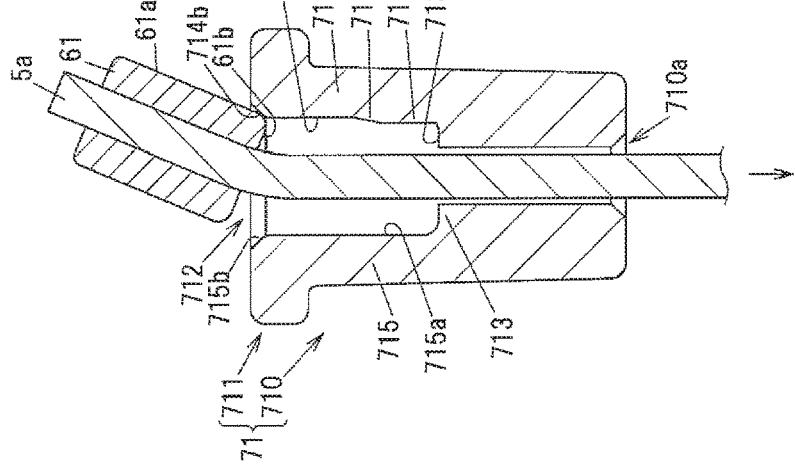
FIG.10A FIG.10B FIG.10C

WINDOW REGULATOR

CROSS-REFERENCE TO RELATED APPLICATIONS

The present application is a U.S. National Phase of PCT/JP2016/051003 filed on Jan. 14, 2016, claiming priority to Japanese Patent application No. 2015-005944 filed on Jan. 15, 2015. The disclosure of the PCT Application is hereby incorporated by reference into the present Application.

TECHNICAL FIELD

This invention relates to a window regulator.

BACKGROUND ART

A window regulator that lifts and lowers a windowpane by motor driving force is used for a vehicle door (see e.g. PTL1).

The window regulator disclosed in PTL1 is provided with a guide rail arranged along a moving direction of the windowpane (window glass), a carrier plate (slider base) that holds the windowpane, a drum rotated by the motor driving force, wire whose one end is connected to the carrier plate and the other end is connected to the drum, a wire end fixed at a carrier plate side end of the wire, and a cylindrical slide bush that locks the wire end. A housing hole to enclose the wire end and an insertion hole in which the wire is inserted are communicated and formed with the slide bush in an axial direction.

The slide bush is arranged in a box shaped end support arranged in the carrier plate with a spring. The slide bush is slidably arranged on an inner surface in the end support with expansion and contraction movement of the spring. And a leading groove so as to lead the wire inserted in the slide bush to outside of the end support is formed. The wire led from the leading groove is connected to a drum side. The slide bush is constantly energized toward an approach direction to the central portion in the end support by energized force of the spring. The energized force energizes tensile force to the wire.

When the drum rotates and pulls the wire, the slide bush locking the wire end slides toward a pulling direction of the wire in the end support, and abuts on an inner surface in the end support. The pulling force of the wire transmits to the end support through the slide bush. The carrier plate moves for the pulling direction of the wire.

CITATION LIST

Patent Literature

PTL1: JP-A-H09-150631

Since the tensile force is still not applied to the wire when the wire end is inserted in the housing hole of the slide bush in assembling the window regulator, the wire end that is once inserted into the housing hole of the slide bush may escape from the slide bush. It causes decreasing work efficiency in assembling.

It is an object of the present invention to provide a window regulator that increases assembling.

Solution to Problem

According to an embodiment of the invention, a window regulator that is configured to be arranged in a vehicle door and to lift and lower a windowpane of the vehicle door comprises:

a carrier plate holding the windowpane;
a drum rotated by driving a motor that generates a driving force;
a wire whose one end is connected to the carrier plate and whose other end is connected to the drum;
a wire end fixed to an end on a side of the one end of the wire; and
a housing member that is formed of a synthetic resin, houses the wire end and is arranged so as to move forward and backward in a recessed groove arranged in the carrier plate caused by expansion and contraction of a biasing member that generates a biasing force in a direction that a tensile force is applied to the wire,
wherein the housing member is configured to define a housing hole that is surrounded by a base in which an inserting hole to insert the wire is formed, and a sidewall that is formed extending from an outer edge of the base, and
wherein the wire end is housed in the housing hole while being pressed against a protrusion that protrudes from the sidewall.

Advantageous Effects of Invention

According to an embodiment of the present invention, the window regulator that increases assembling can be provided.

BRIEF DESCRIPTION OF DRAWINGS

FIG. 10A is a cross sectional view showing a process to assemble the wire end in the slide bush.
FIG. 10B is a cross sectional view showing the other process to assemble the wire end in the slide bush.
FIG. 10C is a cross sectional view showing another process to assemble the wire end in the slide bush.

DESCRIPTION OF EMBODIMENTS

Embodiments

A structure and movement of a window regulator according to the embodiment in the present invention will be described below with reference to FIGS. 1 to 10C.

Figure 1:
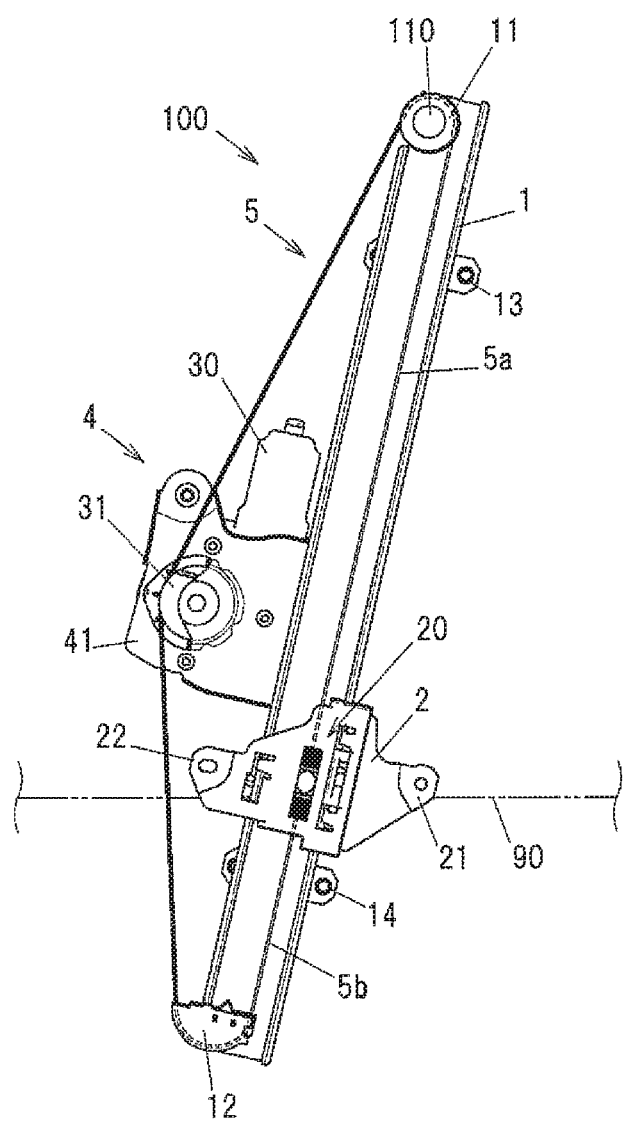
FIG. 1 is a plan view showing a window regulator according to the present embodiment.
Figure 2:
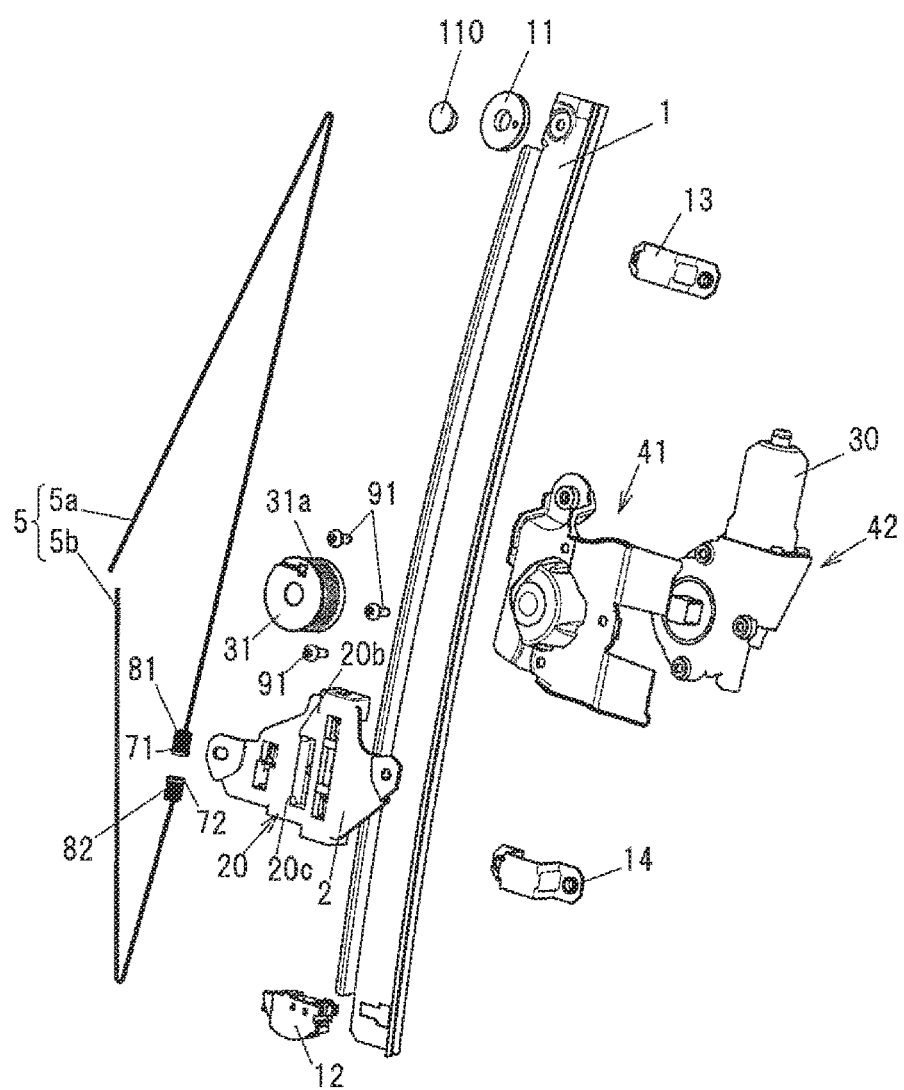
FIG. 2 is an exploded perspective view showing the window regulator.
Figure 3:
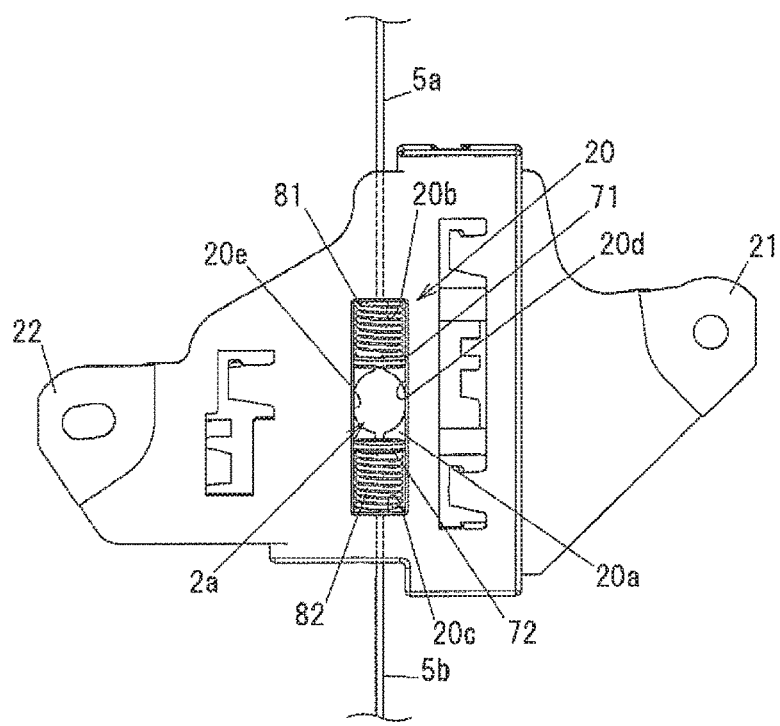
FIG. 3 is a plan view showing a carrier plate.

FIG. 1 is a plan view showing the window regulator according to the present embodiment. A windowpane is shown by an imaginary line (two dotted line) in FIG. 1. FIG. 2 is an exploded perspective view showing the window regulator. FIG. 3 is a plan view showing a carrier plate, and a slide bush and a coil spring arranged in the carrier plate.

The window regulator 100 is arranged at a vehicle door. The window regulator 100 lifts and lowers the windowpane 90 of the door. The windowpane 90 is guided by a glass guide (not shown) and moves in a vertical direction.

The window regulator 100 is provided with a guide rail 1 arranged along a moving direction of the windowpane 90, a carrier plate 2 that is guided by the guide rail 1 and holds the windowpane 90, a drum 31 rotated by driving a motor 30 that generates driving force, wire 5 whose one end is connected to the carrier plate 2 and the other end is connected to the drum 31, and a housing 4 that holds the motor 30 and the drum 31.

The wire 5 comprises a lifting wire 5a whose one end is connected to the carrier plate 2, and the other end is connected to the drum 31 through a pulley 11 arranged at a top end of the guide rail 1, and a lowering wire 5b whose one end is connected to the carrier plate 2, and the other end is connected to the drum 31 through a wire guide 12 arranged at a bottom end of the guide rail 1. The pulley 11 is rotatably arranged about a spindle 110 as a rotational center. The wire guide 12 is made from resin and guides the wire 5 by sliding. Meanwhile, the wire guide 12 may be used at the top end of the guide rail 1 and the pulley 11 may be used at the bottom end of the guide rail 1.

The guide rail 1 is a long metallic member. The guide rail 1 is curved in an arched line along the longitudinal direction of the guide rail 1. The guide rail 1 is attached to a door panel (not shown) through brackets 13, 14 that are respectively arranged at top end side and bottom end side of the guide rail 1 from the central portion in the longitudinal direction.

The carrier plate 2 is a resin member formed in a plate shape. A recessed groove 20 that is locked at ends of the lifting wire 5a and the lowering wire 5b respectively are formed nearby the central portion of the carrier plate 2. Glass connecting portions 21, 22 to which the windowpane 90 is connected are respectively formed at right and left ends of the carrier plate 2 in the horizontal direction.

The drum 31 is a cylindrical member. A spiral groove 31a is formed on an outer peripheral surface of the drum 31. The drum 31 is held in the housing 4 arranged nearby the intermediate portion in the longitudinal direction of the guide rail 1.

The housing 4 is provided with a drum housing 41 enclosing the drum 31, a gear housing 42 enclosing a speed reducer (not shown) decelerating rotation of the motor 30. The drum housing 41 and the gear housing 42 are connected each other using a plurality of bolts 91.

As shown in FIG. 3, a lifting slide bush 71 and a lifting coil spring 81 as a biasing member to energize the lifting slide bush 71 are arranged in the recessed groove 20 of the carrier plate 2. Similarly, a lowering slide bush 72 and a lowering coil spring 82 as a biasing member to energize the lowering slide bush 72 are arranged in the recessed groove 20 of the carrier plate 2.

An inner surface of the recessed groove 20 is constructed from a bottom surface 20a of which a through hole 2a piercing the carrier plate 2 in the thickness direction is formed at the central portion, a first abutting surface 20b that abuts on the lifting coil spring 81, a second abutting surface 20c that abuts on the lowering coil spring 82, and first and second sliding contact surfaces 20d and 20e that sliding contact and face each other.

When the drum 31 rotates, length of the lifting wire 5a between the pulley 11 and the carrier plate 2 and length of the lowering wire 5b between the wire guide 12 and the carrier plate 2 change.

That is, as a rotational direction of the drum 31 in lowering the carrier plate 2 is a forward direction (the clockwise direction shown in FIG. 1) and the rotational direction of the drum 31 in lifting the carrier plate 2 is a reverse direction (the counterclockwise direction shown in FIG. 1), the length of the lifting wire 5a between the pulley 11 and the carrier plate 2 increases and the length of the lowering wire 5b between the wire guide 12 and the carrier plate 2 decreases by forwardly rotating the drum 31. Meanwhile, the length of the lifting wire 5a between the pulley 11 and the carrier plate 2 decreases and the length of the lowering wire 5b between the wire guide 12 and the carrier plate 2 increases by reversely rotating the drum 31. The carrier plate 2 moves in the vertical direction to the guide rail 1 according to the change in the length.

Next, structures according to the lifting wire end 61, the lifting slide bush 71, and the lifting coil spring 81 will be described below with reference to FIGS. 4 to 10C. Furthermore, the lifting wire end 61 (It will be referred to as "the wire end 61" below), the lifting slide bush 71 (It will be referred to as "the slide bush 71" below), and the lifting coil spring 81 (It will be referred to as "the coil spring 81" below) have same structures to a lowering wire end 62 (not shown), a lowering slide bush 72, and a lowering coil spring 82, except that an arrangement direction in the window regulator 100 is different. The explanation of the lowering wire end 62, the lowering slide bush 72, and the lowering coil spring 82 will be omitted.

Figure 4:
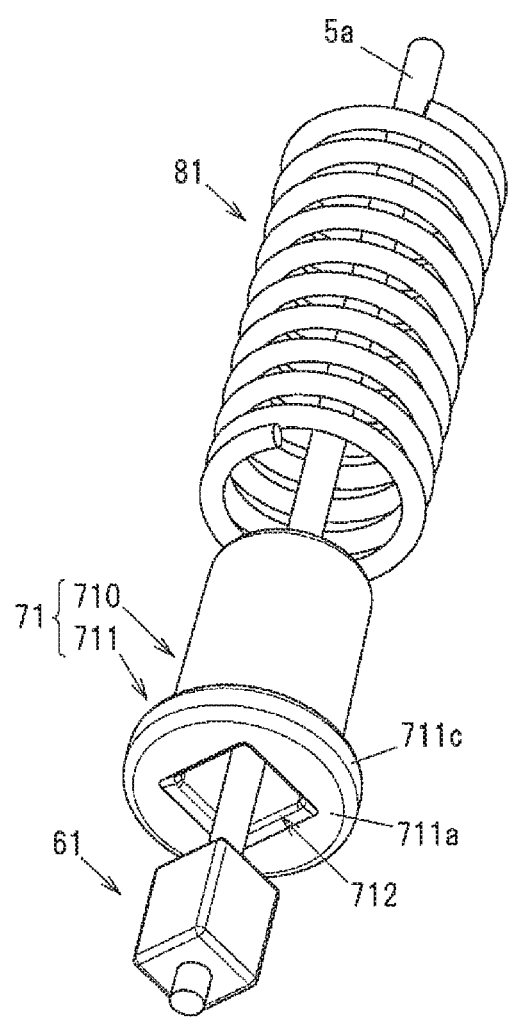
FIG. 4 is an exploded perspective view showing a slide bush, a wire end, and a coil spring.
Figure 5A:
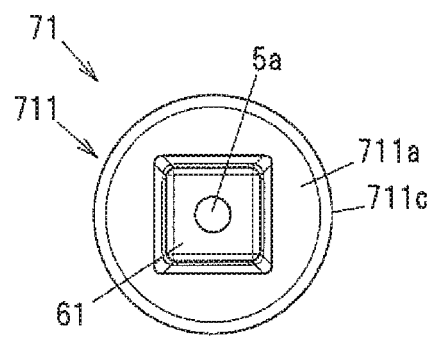
FIG. 5A is a top view showing the slide bush in which the wire end is assembled.
Figure 5B:
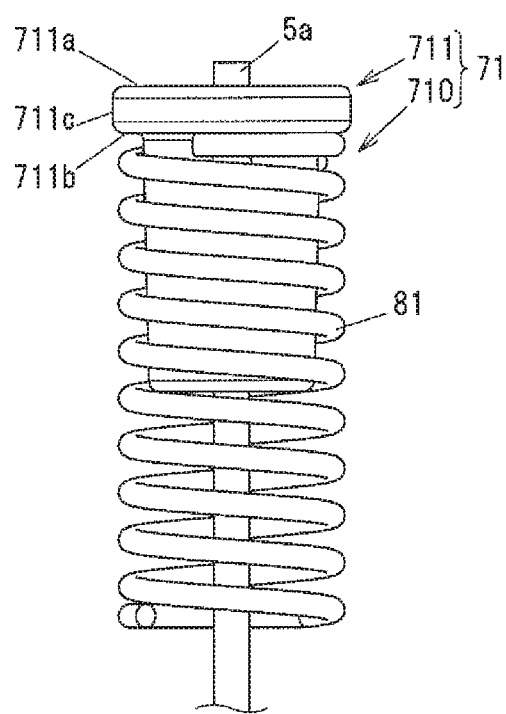
FIG. 5B is a front view showing the slide bush in which the wire end is assembled.
Figure 6A:
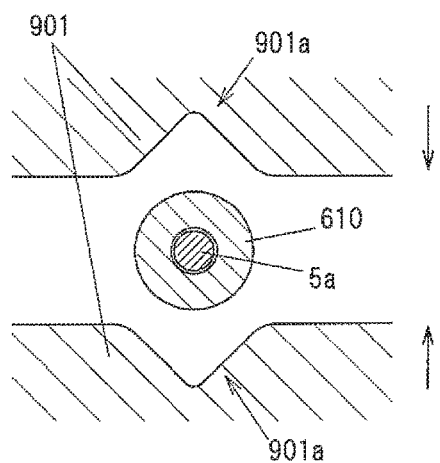
FIG. 6A is a cross sectional view schematically showing a swaging process of the wire end before swaging.
Figure 6B:
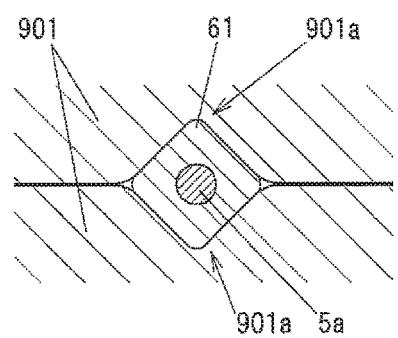
FIG. 6B is a cross sectional view schematically showing the swaging process of the wire end after swaging.
Figure 7A:
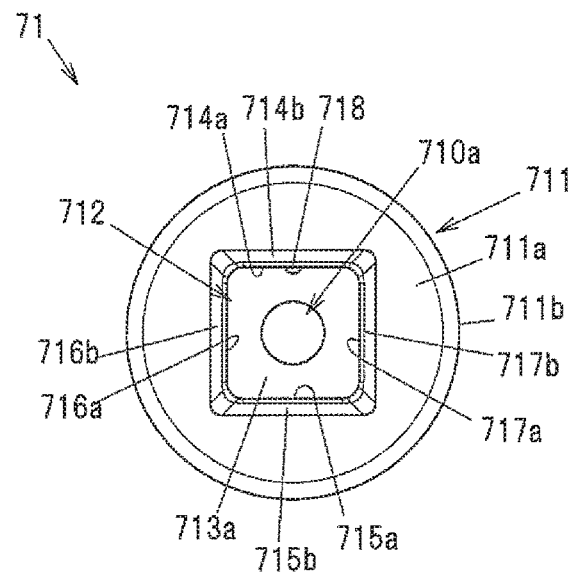
FIG. 7A is a top view showing the slide bush.
Figure 7B:
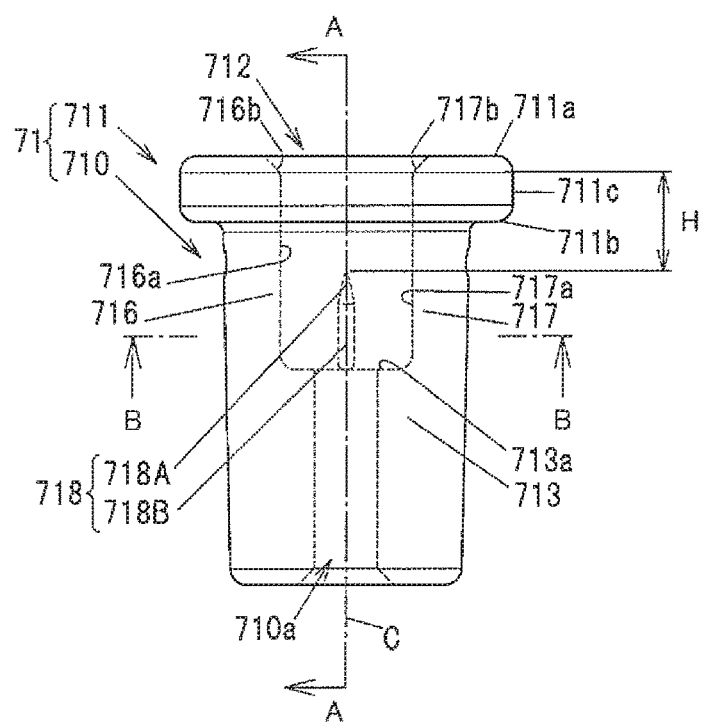
FIG. 7B is a front view showing the slide bush.
Figure 8:
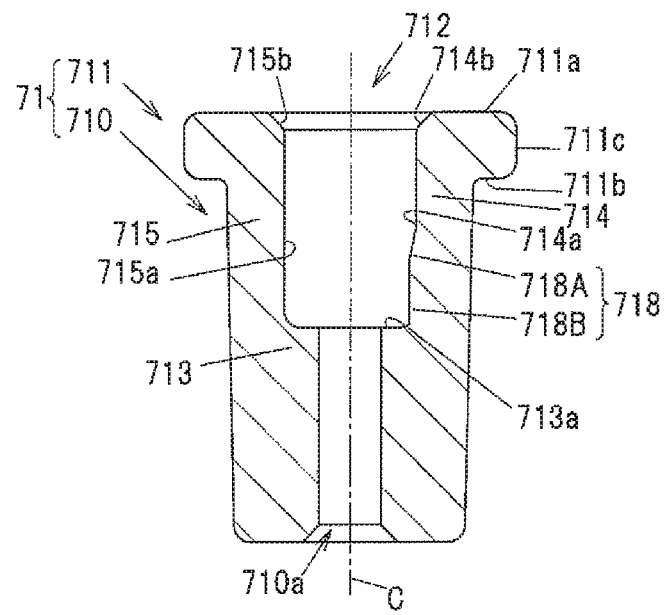
FIG. 8 is a cross sectional view cut along the line A-A in FIG. 7B.
Figure 9:
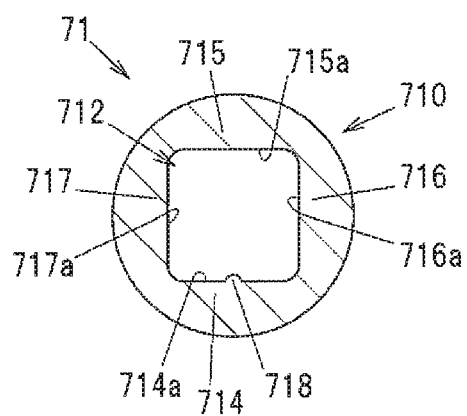
FIG. 9 is a cross sectional view cut along the line B-B in FIG. 7B.

FIG. 4 is an exploded perspective view showing the slide bush 71, the wire end 61, and the coil spring 81. FIG. 5A is a top view showing the slide bush 71 in which the wire end 61 is assembled. FIG. 5B is a front view showing the slide bush 71 in which the wire end 61 is assembled. FIG. 6A is a cross sectional view schematically showing a swaging process of the wire end 61 viewed from the axial direction of the lifting wire 5a before swaging. FIG. 6B is a cross sectional view schematically showing the swaging process of the wire end 61 after swaging. FIG. 7A is a top view showing the slide bush 71. FIG. 7B is a front view showing the slide bush 71. FIG. 8 is a cross sectional view cut along the line A-A in FIG. 7B. FIG. 9 is a cross sectional view cut along the line B-B in FIG. 7B. FIG. 10A to 10C are cross sectional views showing each process to assemble the wire end 61 in the slide bush 71. FIG. 10A shows a process to assemble the wire end 61 in the slide bush 71 before inserting the wire end 61 into the slide bush 71. FIG. 10B shows the process to assemble the wire end 61 into the slide bush 71 in inserting the wire end 61 into the slide bush 71. FIG. 10C shows the process to assemble the wire end 61 in the slide bush 71 after inserting the wire end 61 into the slide bush 71.

The slide bush 71 is an approximately cylindrical resin mold. The slide bush 71 is arranged in the recessed groove 20 (shown in FIG. 3) in the carrier plate 2. The slide bush 71 can move forwardly and backwardly in the recessed groove 20 by expansion and contraction of the coil spring 81.

As shown in FIG. 4, the wire end 61 that is an approximately rectangular shape is fixed at a carrier plate 2 (shown in FIGS. 1 to 3) side end of the lifting wire 5a. For example, the wire end 61 is a member made of metals such as Zinc. The wire end 61 is fixed at the end of the lifting wire 5a by swaging using one pair of swaging apparatuses 901 in which a V-shaped swaging groove 901a shown in FIG. 6A is formed.

More particularly, as shown in FIG. 6A, first, a cylindrical metal part 610 that becomes as the wire end 61 is inserted at the end of the lifting wire 5a, and the cylindrical metal part 610 is arranged at a position where is put between one pair of the swaging grooves 901a of the swaging apparatuses 901. Then, the approximately rectangular shaped wire end 61 is formed by moving one pair of the swaging apparatuses 901 forward each approaching direction (the arrow direction shown in FIG. 6A) and swaging the cylindrical metal part 610 from an outer peripheral side using one pair of the swaging groove 901a.

The slide bush 71 integrally comprises a cylindrical portion 710 of which a step hole made from a wire insertion hole 710a and a housing hole 712 is formed at the central portion, and a flange 711 formed so as to have larger diameter than the cylindrical portion 710. The flange 711 is formed so as to protrude from an outer peripheral surface of the cylindrical portion 710 at an opening end of the cylindrical portion 710. The slide bush 71 is a member formed of a synthetic resin. For example, a polyacetal is suitably used for the slide bush 71.

As shown in FIGS. 7A, 7B, for the flange 711 of the slide bush 71, an axial end surface that points to the opposite side against the coil spring 81 (shown in FIGS. 4, 5B) is formed as an opposite surface 711a that is opposite to the lowering slide bush 72, and an axial end surface that is an opposite side against the opposite surface 711a is formed as an abutting surface 711b that abuts on one end of the coil spring 81. Further, an outer peripheral surface of the flange 711 is formed as a sliding surface 711c that slides on a first sliding surface 20d and a second sliding surface 20e of the recessed groove 20 in the carrier plate 2.

One end of the coil spring 81 abuts on the abutting surface 711b of the flange 711 and the other end of the coil spring 81 abuts on a first abutting surface 20b (shown in FIG. 3) in the recessed groove 20 in the carrier plate 2. The coil spring 81 is pressed in the axial direction. Further, the cylindrical portion 710 of the slide bush 71 is arranged in the coil spring 81. Thus, the slide bush 71 is constantly 7d toward a separating direction from the first abutting surface 20b in the recessed groove 20 in the carrier plate 2. The tensile force is applied to the lifting wire 5a.

The housing hole 712 enclosing the wire end 61 is formed in the central portion of the cylindrical portion 710 of the slide bush 71. As shown in FIG. 7A, the housing hole 712 is formed as a rectangle hole having a depth in the axial direction whose cross section viewed from the opposite surface 711a side along the central axis C of the slide bush 71 is an approximately rectangular shape.

Also, the housing hole 712 is formed as a space surrounded by a base 713 in which the wire insertion hole 710a inserting the lifting wire 5a is formed, and a plurality of sidewalls extended from an outer periphery of the base 713 toward a flange 711 side of the slide bush 71 in the axial direction (the first to fourth sidewalls 714 to 717 described below).

A plurality of sidewalls of the cylindrical portion 710 is provided with a first sidewall 714 on which a protrusion 718 protruded toward the central portion of the housing hole 712 is formed, a second sidewall 715 that is opposite to the first sidewall 714, and third and fourth sidewalls 716, 717 that are interposed between the first and second sidewalls 714, 715 and that are opposite each other. For the base 713, the axial end surface that points to an opening side of the housing hole 712 is formed as the bottom surface 713a of the housing hole 712.

An inner surface of the first sidewall 714 is formed from a first flat surface 714a formed along the direction parallel to the central axis C of the slide bush 71, and an inclined surface 714b that inclines against the axial direction such that the distance between the inclined surface 714b and the central axis C of the slide bush gradually decreases toward a bottom surface 713a side of the housing hole 712. The inclined surface 714b is formed at the inner surface of the first sidewall 714 at the opening end of the housing hole 712.

Similarly, inner surfaces of the second to fourth sidewalls 715 to 717 are formed by the second to fourth flat surfaces 715a to 717a formed along the direction parallel to the central axis C of the slide bush 71, and the second to fourth inclined surfaces 715b to 717b that incline with respect to the axial direction such that the distance from the central axis C increases from the bottom surface 713a of the housing hole 712 toward the opening side of the housing hole 712 in the axial direction.

As shown in FIG. 7A, the protrusion 718 is a hemicycle shape viewed from an opposite surface 711a side along the central axis C of the slide bush 71 and extended and formed toward the direction parallel to the central axis C of the slide bush 71. As shown in FIG. 7B, the protrusion 718 is extended and formed from the first inclined surface 714b of the first sidewall 714 toward the bottom surface 713a side along the central axis C of the slide bush 71. In this embodiment, the protrusion 718 is extended and formed from the position where is separated in a predetermined distance from the first inclined surface 714b of the first sidewall 714 toward the bottom surface 713a side of the housing hole 712 along the central axis C of the slide bush 71. In such case, when the predetermined distance is defined as H (shown in FIG. 7B), for example, the distance H is set within a range between 2 to 3 mm.

As shown in FIG. 8, the protrusion 718 comprises an inclined portion 718A that inclines to the axial direction such that a protrusion height from the flat surface 714a of the first sidewall 714 increases in the axial direction of the slide bush 71 as the protrusion 718 moves from the opening side of the housing hole 712 toward the bottom surface 713a side, and an extending portion 718B that extends such that the protrusion height from the first flat surface 714a of the first side wall 714 is kept constantly with continuing in the bottom surface 713a side end of the inclined portion 718A. The inclined portion 718A and the extending portion 718B are extended in parallel to the central axis C of the slide bush 71.

For example, the wire end 61 can be fixed in the housing hole 712 of the slide bush 71 by pressing slightly. Specifically, as shown in FIG. 10A, first, one end of the wire end 61 is inserted into the housing hole 712 by pulling the lifting wire 5a to the opposite direction (the arrow direction shown in FIG. 10A) against the end in which the wire end 61 is fixed while the wire end 61 is arranged at the opposite surface 711a side of the slide bush 71. In such case, the wire end 61 is guided into the housing hole 712 using the first to fourth inclined surfaces 714b to 717b in the slide bush 71.

As shown in FIG. 10B, when one end of the wire end 61 enters into the housing hole 712, the wire end 61 slides over the extending portion 718B after stranding on the inclined portion 718A of the protrusion 718. In such case, the wire end 61 enters toward the bottom surface 713a side along the axial direction of the slide bush 71 while the wire end 61 changes the extending portion 718B of the protrusion 718 so as to press toward the first flat surface 714a side of the first side wall 714. That is to say, the wire end 61 enters into the bottom surface 713a side along the axial direction of the slide bush 71 while the side surface 61a receives pressure toward the direction separating from the first flat surface 714a of the first sidewall 714.

Further, as shown in FIG. 10C, the end surface 61b of the wire end 61 abuts on the bottom surface 713a of the housing hole 712 when the wire end 61 enters into the bottom surface 713a side in the axial direction. Thus, the wire end 61 is fixed in the slide bush 71. That is, the wire end 61 is enclosed in the housing hole 712 by pressing the wire end 61 on the extending portion 718B of the protrusion 718.

Effects of the Embodiment

According to the above explained embodiment, the effects described below can be obtained.

(1) Since the wire end 61 is enclosed in the housing hole 712 of the slide bush 71 by pressing the wire end 61 on the protrusion 718 of the first sidewall 718, the wire end 61 is prevented from escaping from the slide bush 71 caused by friction force between the wire end 61 and the protrusion 718 formed on the first sidewall 714. That is, a process to again house the wire end 61 into the slide bush 71 once housed into the slide bush 71 in assembling, which is escaped, can be omitted. Thus, the assembly between the wire end 61 and the slide bush 71 increases.

(2) Since the protrusion 718 is extended and formed from a position where is separated from the first inclined surface 714b of the first sidewall 714 toward the bottom surface 713a side of the housing hole 712 along the central axis C of the slide bush 71 with the predetermined distance, a position of the wire end 61 is stabilized in inserting the wire end 61 into the housing hole 712 of the slide bush 71 caused by an area surrounded by the first to fourth flat surfaces 714a to 717a on which the protruded protrusion 718 is not formed. Further, since the wire end 61 can enter into a protrusion 718 side while the position of the wire end 61 is stabilized, an inserting process for the wire end 61 into the housing hole 712 of the slide bush 71 in assembling can process easily. Therefore, the assembly more increases.

Although the embodiments have been described, the claimed invention is not intended to be limited to the embodiment. It should be noted that all combinations of the features described in the embodiments are not necessary to solve the problem of the invention. Further, the various kinds of modifications can be implemented without departing from the gist of the invention.

Further, although the wire end 61 is the approximately rectangular shape, it is not limited to. For example, the wire end 61 may be a column shape. As a result, the housing hole 712 of the slide bush 71 may be a circular shape.

Further, in the present embodiment, although the case that the single protrusion 718 is formed on the first sidewall 714 are explained, the number of the protrusion is not limited to thereof. For example, the protrusions 718 may be formed on not only the first sidewall 714 but also a plurality of the other sidewalls (the second to fourth sidewalls 715 to 717) respectively. Moreover, the plurality of protrusions 718 may be formed on the single sidewall. For example, the pluralities of protrusions 718 may be on the first sidewall 714 arranged in parallel with predetermined intervals.

Further, although the lifting wire end 61 and the lifting slide bush 71 in the present embodiment are explained, the same effect can be obtained in the lowering wire end 62 and the lowering slide bush 72 since the lowering wire end 62 and the lowering slide bush 72 have same structures.

Furthermore, although the window regulator of which the drum 31 is arranged nearby the intermediate portion of the guide rail 1 in the longitudinal direction is only explained in the present embodiment, it is not limited to. The window regulator should be a structure that can move windowpane by driving force from driving source. For example, the window regulator may be a self-propelled type window regulator that the motor moves with the windowpane. Also, the window regulator may be a manual type window regulator driven by manual operation of drives etc.

INDUSTRIAL APPLICABILITY

This invention can apply to the window regulator that is arranged in the vehicle door and lifts and lowers the windowpane by the motor driving force etc.

REFERENCE SIGNS LIST

1 GUIDE RAIL
2 CARRIER PLATE
5 WIRE
20 RECESSED GROOVE
30 MOTOR
31 DRUM
61 LIFTING WIRE END
62 LOWERING WIRE END
71 LIFTING SLIDE BUSH
72 LOWERING SLIDE BUSH
81 LIFTING COIL SPRING
82 LOWERING COIL SPRING
90 WINDOWPANE
100 WINDOW REGULATOR
710a WIRE INSERTION HOLE
712 HOUSING HOLE
713 BASE
713a BOTTOM SURFACE
714 to 717 FIRST TO FOURTH SIDEWALLS
714b to 717b FIRST TO FOURTH INCLINED SURFACES
718 PROTRUSION
718A INCLINED PORTION
718B EXTENDING PORTION

The invention claimed is:
1. A window regulator that is configured to be arranged in a vehicle door and to lift and lower a windowpane of the vehicle door, the window regulator comprising:
  a carrier plate holding the windowpane;
  a drum rotated by driving a motor that generates a driving force;
  a wire having a first end connected to the carrier plate and a second end connected to the drum;
  a wire end element fixed to the first end of the wire; and
  a housing member that houses the wire end element, and is arranged so as to move forward and backward in a recessed groove arranged in the carrier plate in response to a biasing member that generates a biasing force in a direction that a tensile force is applied to the wire,
  wherein the housing member is configured to define a housing hole that is surrounded by a base in which an inserting hole to insert the wire is formed, and a sidewall that is formed extending from an outer edge of the base, wherein the wire end element is housed in the housing hole while being pressed against a protrusion that protrudes from the sidewall, wherein an inner surface of the sidewall at an opening end of the housing hole comprises an inclined surface that inclines such that a distance from a central axis of the housing member gradually decreases toward a bottom side of the housing hole, and wherein the protrusion is formed extending from the inclined surface toward the bottom side of the housing hole.

2. The window regulator according to claim 1, wherein the housing member is formed of a synthetic resin.

3. The window regulator according to claim 1, wherein the wire comprises a lift wire for lifting the windowpane by moving the carrier plate.

4. The window regulator according to claim 3, further comprising a lowering wire having a first end connected to the carrier plate and a second end connected to the drum.

5. The window regulator according to claim 1, wherein the housing member comprises a slide bush located in the recessed groove.

6. The window regulator according to claim 5, further comprising a coil spring formed over a portion of the slide bush and a portion of the wire.

* * * * *